(12) United States Patent
Schmucki et al.

(10) Patent No.: US 6,394,505 B1
(45) Date of Patent: May 28, 2002

(54) CONNECTION BETWEEN THE INTAKE END OF A DISCHARGE PIPE AND THE OUTLET END OF A CONNECTION CURVE OF A WATER TOILET

(75) Inventors: Peter Schmucki, Eschenbach; Mario Von Ballmoos, Jona, both of (CH)

(73) Assignee: Geberit Technik, Jona (CH)

( * ) Notice: Subject to any disclaimer, the term of this patent is extended or adjusted under 35 U.S.C. 154(b) by 0 days.

(21) Appl. No.: 09/624,894

(22) Filed: Jul. 24, 2000

(51) Int. Cl.[7] ............................................. F16L 21/06
(52) U.S. Cl. .................. 285/148.26; 285/236; 277/607; 4/252.6
(58) Field of Search ............................. 285/56, 57, 58, 285/59, 60, 111, 148.23, 148.26, FOR 159, 236; 277/607, 626; 4/252.6, DIG. 7

(56) References Cited

U.S. PATENT DOCUMENTS

| | | | |
|---|---|---|---|
| 3,298,698 A | * | 1/1967 | Condon ............. 285/148.26 X |
| 3,400,411 A | * | 9/1968 | Harvey ...................... 285/56 X |
| 3,583,710 A | * | 6/1971 | Burelle .................... 285/111 X |
| 3,680,896 A | * | 8/1972 | Cupit ..................... 285/148.23 |
| 3,686,747 A | | 8/1972 | Bagnulo |
| 4,318,547 A | | 3/1982 | Ericson |
| 4,538,837 A | * | 9/1985 | Cronk ..................... 285/236 X |
| 5,150,926 A | | 9/1992 | Egli |
| 5,324,083 A | | 6/1994 | Vogelsang |
| 5,466,018 A | * | 11/1995 | Stobbart ................. 277/626 X |
| 5,505,497 A | | 4/1996 | Shea et al. |

FOREIGN PATENT DOCUMENTS

| | | | | |
|---|---|---|---|---|
| DE | 32889 | * | 9/1885 | ........ 285/FOR 159 |
| DE | 199 06 870 | | 5/2000 | |
| FR | 2675879 | * | 10/1992 | ........ 285/FOR 159 |
| GB | 704684 | * | 2/1954 | ........ 285/FOR 159 |
| IT | 494634 | * | 11/1955 | ........ 285/FOR 159 |
| JP | 10089562 | | 4/1998 | |

* cited by examiner

Primary Examiner—Lynne H. Browne
Assistant Examiner—Greg Binda
(74) Attorney, Agent, or Firm—Browdy and Neimark, P.L.L.C.

(57) ABSTRACT

A connection adapted to connect an intake end (10) of a discharge pipe (9) and an outlet end (8) of a connecting curve (7) of a water toilet, wherein the outlet end (8) projects concentrically into the intake end (10) of the discharge pipe (9), said connection comprising a rubber-elastic sealing collar (11), adapted to seal said outlet (8) and said intake end against one another, wherein the sealing collar (11) is h-shaped in a radial section, and has a first downwardly projecting region (12) adapted to tightly engage an outside of the intake end (10); a second downwardly projecting region (13) adapted to tightly engage an outside of the outlet end (8) and a upward-projecting region (14) adapted to tightly engage against the outside of the outlet end (8) of the connecting curve (7).

7 Claims, 2 Drawing Sheets

CONNECTION BETWEEN THE INTAKE END OF A DISCHARGE PIPE AND THE OUTLET END OF A CONNECTION CURVE OF A WATER TOILET

BACKGROUND OF THE INVENTION

1. Technical Field of the Invention

The invention is directed to a connection between an intake end of a discharge pipe and an outlet end of a connecting curve of a water toilet.

2. Prior Art

It is known that toilet systems with water flushing must be connected to a discharge pipe of a waste-disposal line for carrying off the flushing water following a flushing procedure. The flushing water passes through a siphon, and finally through a connecting curve into a discharge pipe. The connecting curve can be a component of the toilet bowl, or it can be a pipe piece that is molded onto a connection piece of the bowl. There are essentially two types of connections from the connecting curve to the discharge pipe. In one case, the discharge pipe extends horizontally into a wall, and the connecting curve correspondingly has a horizontal outlet end. In the other case, the discharge pipe extends essentially vertically in a structure curve, and the connecting curve correspondingly has an outlet end that extends vertically downward. In both cases, the toilet bowl must be precisely positioned such that the outlet end of the discharge curve projects concentrically into the discharge pipe. Narrow space conditions often impede the assembly process. Moreover, the sight of the point of connection is often unpleasant.

The end of the connection curve must be connected to the end of the discharge pipe permanently and gas-tight. A reliable seal, which, unfortunately, must be produced quickly and simply under difficult assembly conditions, is therefore crucial. An overpressure of up to one bar in the discharge line should not negatively affect the seal.

Conventionally, cap-shaped sealing collars having an opening for receiving the outlet end of the discharge curve have been used to seal the aforementioned connection. During assembly, these collars are positioned on the edge of the discharge pipe. It has been seen in practice, however, that leaks can occur if an overpressure is present in the discharge line, or if the outlet end of the discharge curve is positioned at a diagonal.

OBJECT AND SUMMARY OF THE INVENTION

It is the object of the invention to produce a connection of the above-described type, which is simple to assemble, yet effects a permanent, tight connection.

In a generic connection, the object is accomplished in that, seen in the radial section, the sealing collar has a basic h shape, and the two downward-projecting regions respectively rest tightly against the outside of one of the ends, and the upward-projecting region rests tightly against the outside of the outlet end of the connecting curve. The upward-projecting region creates a significantly longer guide for the outlet end of the connecting curve and, simultaneously, a larger sealing surface.

A particularly good seal and simple assembly are attained when, according to a modification of the invention, a downward-projecting region of the connection rests tightly against the outside of the outlet end of the connecting curve. This is achieved because the downward-projecting region tapers conically such that, when the outlet end is inserted, this region is radially tensed and rests against the outside of the outlet end under tension. The downward-projecting region forms a sort of funnel, which widens to a cylindrical shape when the outlet end is inserted, and is thereby under considerable tension. After assembly, this region rests under tension against the outside of the outlet end, which assures a good seal, even in the event of an overpressure.

A particularly high overpressure without leaks is possible if, according to a modification of the invention, an annular intermediate space is formed between the region resting against the outside of the outlet end and the inside of the intake end of the discharge pipe, such that, in the event of an overpressure in the pipe, this region is pressed against the outside of the outlet end. An overpressure thus increases the pressing pressure of the lower region against the outlet end, which heightens the sealing effect. It has been seen that the seal is assured with an overpressure of about one bar.

In accordance with a modification of the invention, the stability of the connection is further increased if the region resting against the outside of the intake end of the discharge pipe is pressed against the aforementioned outside by a tension ring located on the outside. A tension ring of this type can be positioned on the outside of the upward-projecting region of the sealing collar. The tension ring or rings produces or produce a highly-stable connection between the sealing collar and the discharge pipe or the discharge curve. Movements or vibrations of the discharge line therefore cannot impair the seal.

BRIEF DESCRIPTION OF THE DRAWINGS

An exemplary embodiment of the invention is described in detail below in conjunction with the drawings.

DETAILED DESCRIPTION OF THE PREFERRED EMBODIMENTS OF THE INVENTION

Figure 3:
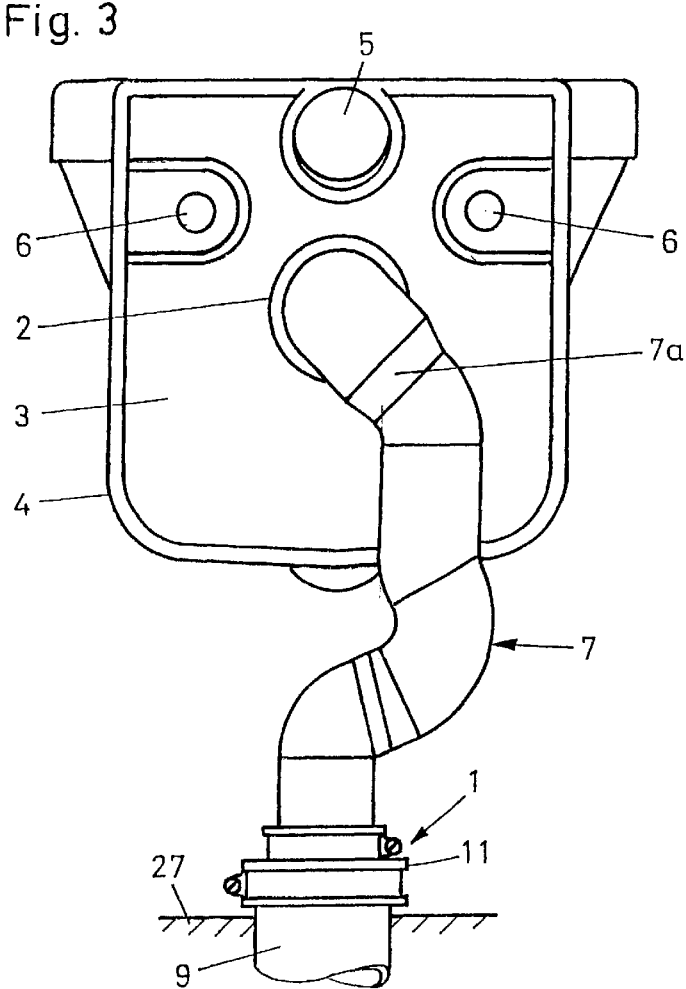
FIG. 3 shows a view, partly in section, of a connection and a toilet having a vertical descent of the discharge curve according to the invention.

FIG. 3 shows a toilet bowl 4 having a rear side 3, to which a connecting curve 7 is attached in a liquid-tight manner by a flange 2. The bowl 4 is secured in a known way to a wall or a support base at openings 6. Flushing water is supplied to the bowl 4 through a rear opening 5, which is connected to a flushing apparatus, for example, a flushing valve or a water tank, by way of a flushing curve, not shown. In this embodiment, the connecting curve 7 is a plastic pipe having a downward-oriented outlet end 8. The discharge curve 7 is embodied such that a closed flow is formed inside it after a narrowing 7a. In this way, a highly-effective flushing can be achieved. The discharge curve 7 can, however, also be realized with a standard pipe, as has been the case in the past. Finally, an embodiment in which the discharge curve 7 is molded onto the toilet bowl 4 and is produced from, for example, ceramic, is also conceivable.

A connection 1 with a sealing collar 11 connects the outlet end 8 of the discharge curve 7 to the intake end 10 of a discharge pipe 9. As shown in FIG. 3, this discharge pipe 9 extends vertically into a wall 27. The discharge pipe 9 is usually a plastic pipe, and projects beyond the wall 27, as illustrated in FIG. 3.

In a flushing procedure, the flushing water passes through the conventional siphon, not shown here, into the discharge curve 7 and, finally, into the discharge pipe 9.

Figure 1:
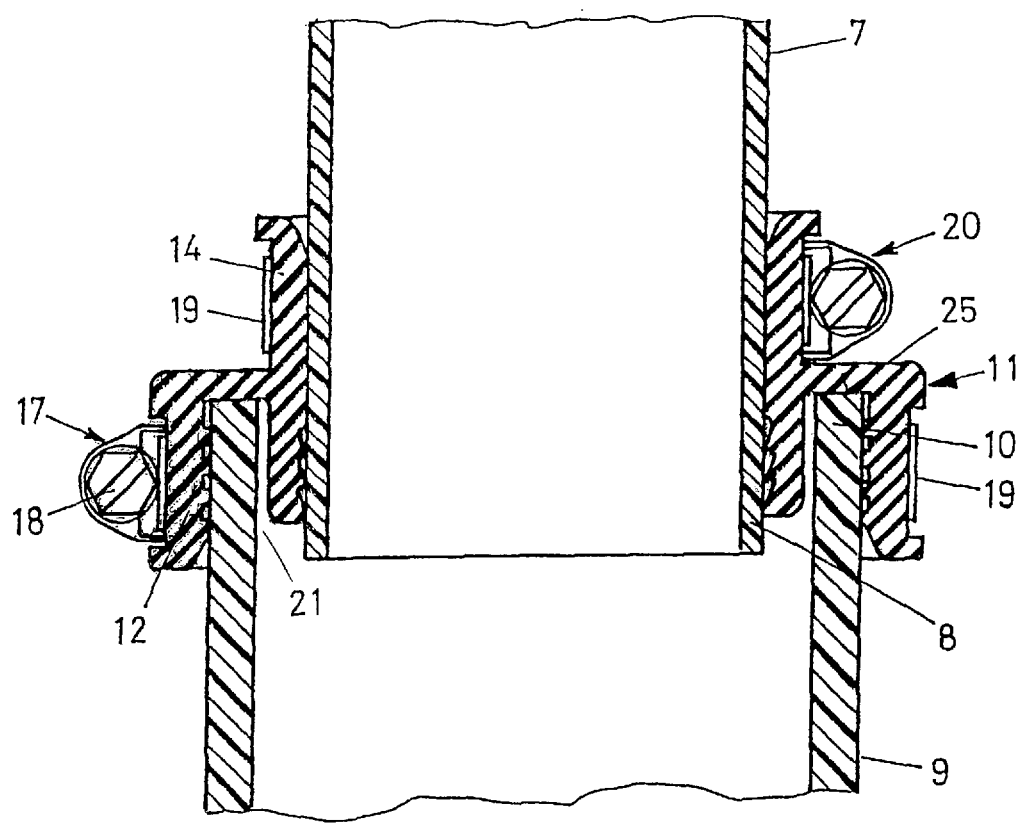
FIG. 1 shows an axial section through a connection of the invention.

The connection 1 tightly connects the outlet end 8 to the intake end 10. As FIG. 1 clearly shows, the outlet end 8 projects into the intake end 10, and the two ends are oriented as coaxially as possible. A sealing collar 11 seals the two pipe ends 8 and 10 tightly against one another. The sealing collar 11 is preferably produced in one piece from a rubber-elastic material. As FIG. 1 illustrates, the radial section of the sealing collar 11 is basically h-shaped. The sealing collar 11 has four regions that perform different functions. These regions 12, 13, 14 and 28 are explained as follows.

The downward-projecting region 12 has on its inside a plurality of circumferential sealing lips 23, which rest against the outside of the intake end 10. As shown in FIG. 1, a tension ring 17, which has, for example, a circumferential band 19 and a tensioning screw 18, is preferably placed into a circumferential, outside groove 15. This tension ring 17 tenses the region 12 against the outside of the intake end 10. The sealing collar 11 is thus fixedly connected to the intake end 10. The tension ring 17 can, however, also be replaced by a different tensing element.

Figure 2:
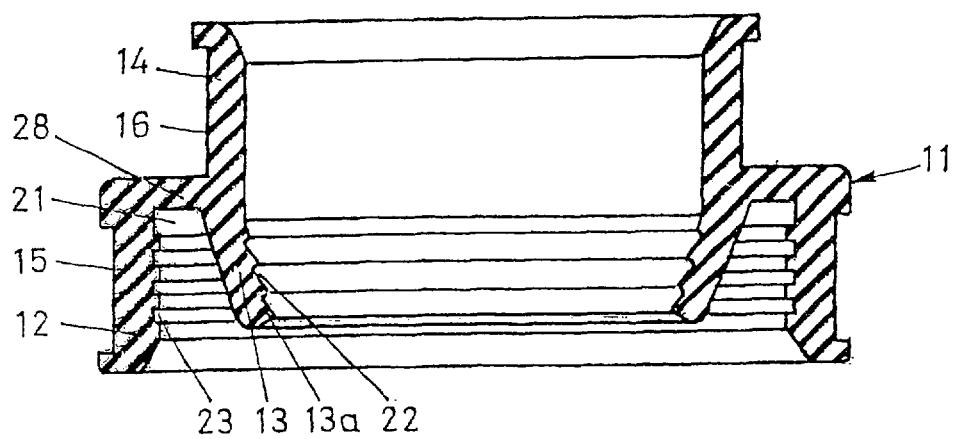
FIG. 2 shows a section through a sealing collar according to that of FIG. 1.

The region 13, which also projects downward, is connected to the region 12 by way of a horizontal region 28. This region 13 also has inside, circumferential sealing lips 22, as can be seen particularly clearly in FIG. 2. Before the outlet end 8 is inserted into the collar 11, the region 13 has a conical or tapered shape, as shown in FIG. 2, and narrows in the downward direction. The inside diameter of the lowermost, narrowest region 13a is significantly smaller than the outside diameter of the outlet end 8. The region 13 is produced from a rubber-elastic material. When the intake end 8 is inserted, therefore, the region 13 is radially tensed. This tension force presses the sealing lips 22 against the outside of the outlet end 8. Because of the conical shape of the region 13, the tension force increases considerably down to the region 13a as suggested in FIG. 4.

As FIG. 1 shows, an annular space 21 is located between the inside of the intake end 10 and the outside of the region 13. In the event of an overpressure from the line, a radial pressure is exerted on the region 13 in the annular space 21, which presses the region 13 more tightly against the outlet end 8. An overpressure in the line, and thus in the discharge pipe 9, therefore increases the sealing effect.

As shown in FIGS. 1 and 2, the annular flange or upward-projecting region 14 also has a circumferential groove 16 on the outside, into which a tension ring 20 is preferably inserted. The tension ring 20 is preferably embodied identically to the tension ring 17, and likewise performs the function of fixedly connecting the region 14 to the outlet end 8. The region 14 thus performs the function of a securing element. This region 14 also increases the sealing surface, and therefore heightens the sealing effect. The region 14 additionally acts as a guide and, with the region 13, creates a comparatively long guide region for the intake end 8. This guide orients the outlet end 8 as coaxially as possible with respect to the discharge pipe.

Figure 4:
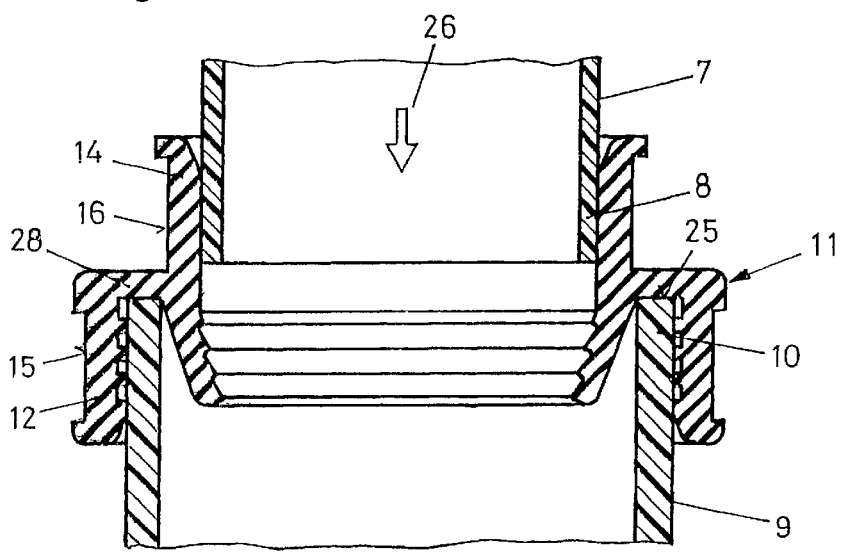
FIG. 4 shows a schematic sectional view of the assembly of the connection according to the invention.

According to FIG. 4, during assembly, the sealing collar 11 is placed on the intake end 10, with the region 28 forming a stop at the end face 25 of the intake end 10. The connecting curve 7 is inserted into the sealing collar 11 in the direction of the arrow 26. In the process, the outlet end 8 is first guided in the region 14. If the connecting curve 7 is pushed further downward in the direction of the arrow, as illustrated in FIG. 4, the conical region 13 is elastically tensed. If the connecting curve 7 is completely inserted, as shown in FIG. 1, the tensing rings 17 and 20 are in position, thereby connecting the sealing collar 11 securely to the ends 10 and 8. If necessary, the connection 1 can be broken without damage through the detachment of the tensing rings 17 and 20 and the withdrawal of the connecting curve 7.

What is claimed is:

1. A connection adapted to connect an intake end (10) of a discharge pipe (9) and an outlet end (8) of a connecting curve (7) of a water toilet, wherein the outlet end (8) projects concentrically into the intake end (10) of the discharge pipe (9), said connection comprising a single unitary rubber-elastic sealing collar (11), adapted to seal said outlet (8) and said intake end against one another, wherein the sealing collar (11) is h-shaped in a radial section, and has a first downwardly projecting region (12) adapted to tightly engage an outside of the intake end (10);

a second downwardly projecting region (13) adapted to tightly engage an outside of the outlet end (8) and an upward-projecting region (14) adapted to tightly engage against the outside of the outlet end (8) of the connecting curve (7);

wherein the second downward-projecting region (13) is conically tapered toward a bottom thereof so that, when the outlet end (8) is inserted into the second downward projecting region, said second downward-projecting region is radially tensed;

wherein an annular intermediate space (21) is formed between the second downward-projecting region (13) and an inside of the intake end (10) of the discharge pipe (9), such that in the event of an overpressure in the discharge pipe (9) the first region (13) is pressed against the outside of the outlet end (8);

wherein the first downward-projecting region (12) is pressed against the intake end (10) by a tensing element (17) positioned on an outside thereof;

wherein the upward-projecting region (14) is pressed against the outside of the outlet end (8) by a tensing element (20) that is positioned on an outside thereof, and wherein a horizontal region (28) between the upward-projecting region (14) and the first downward-projecting region (12) forms a stop for an end face (25) of the intake end (10).

2. The connection according to claim 1, wherein the second downward-projecting region (13) has a plurality of circumferential sealing lips (22) on an inside thereof.

3. The connection according to claim 1, wherein the first downward-projecting region (12) is tensed against the outside of the intake end (10).

4. The connection according to claim 1, wherein the upward-projecting region (14) is an annular flange, which secures the outlet end (8) of the connecting curve (7) to the sealing collar (11).

5. The connection according to claim 4, wherein the upward-projecting region (14) is pressed against the outside of the outlet end (8).

6. The connection according to claim 1, wherein the sealing collar (11) is a unitary piece made from a rubber-elastic material.

7. The connection according to claim 1, wherein the sealing collar (11) has at least one circumferential groove (15, 16) on an outside thereof, which receives a tensing ring (17, 20).

* * * * *